UNITED STATES PATENT OFFICE.

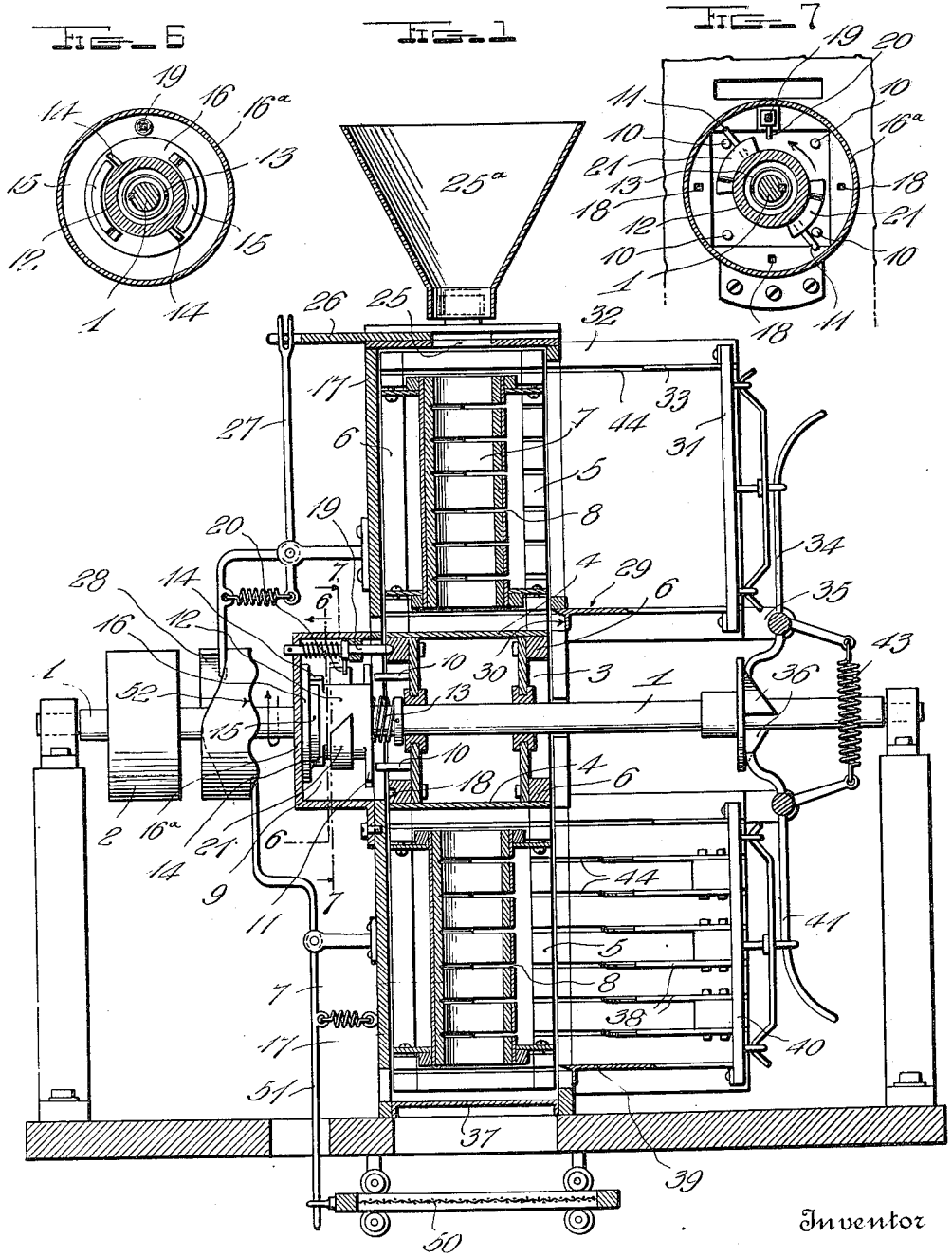

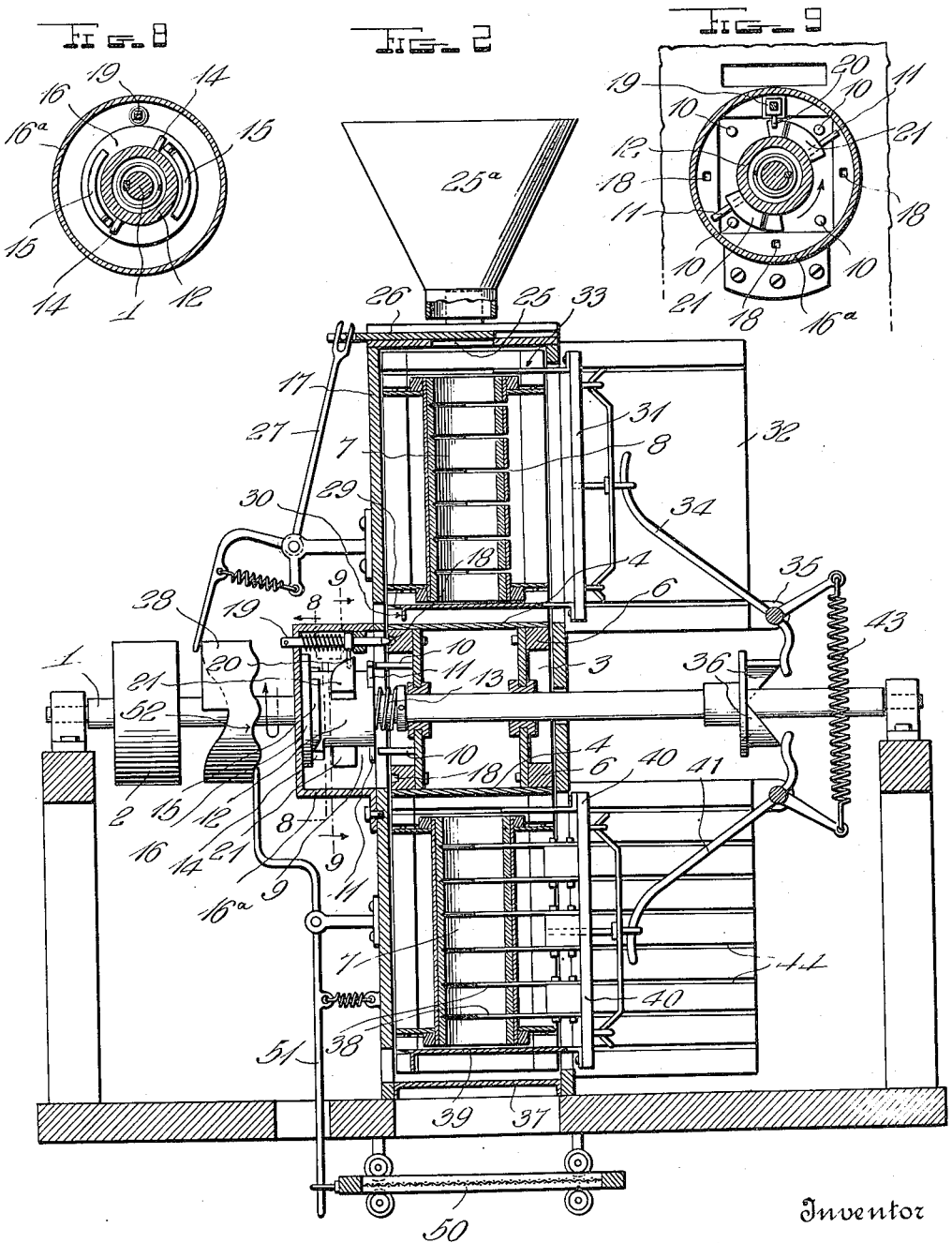

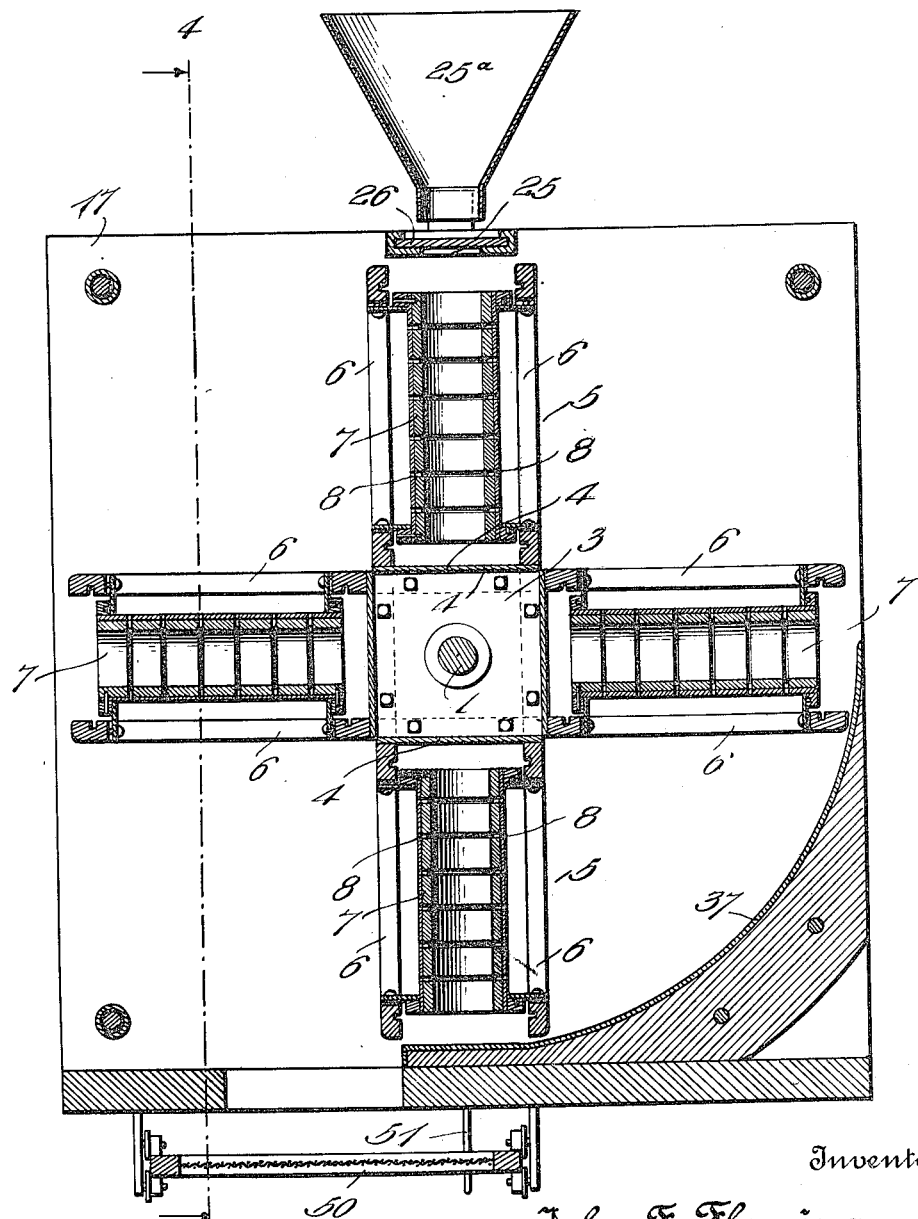

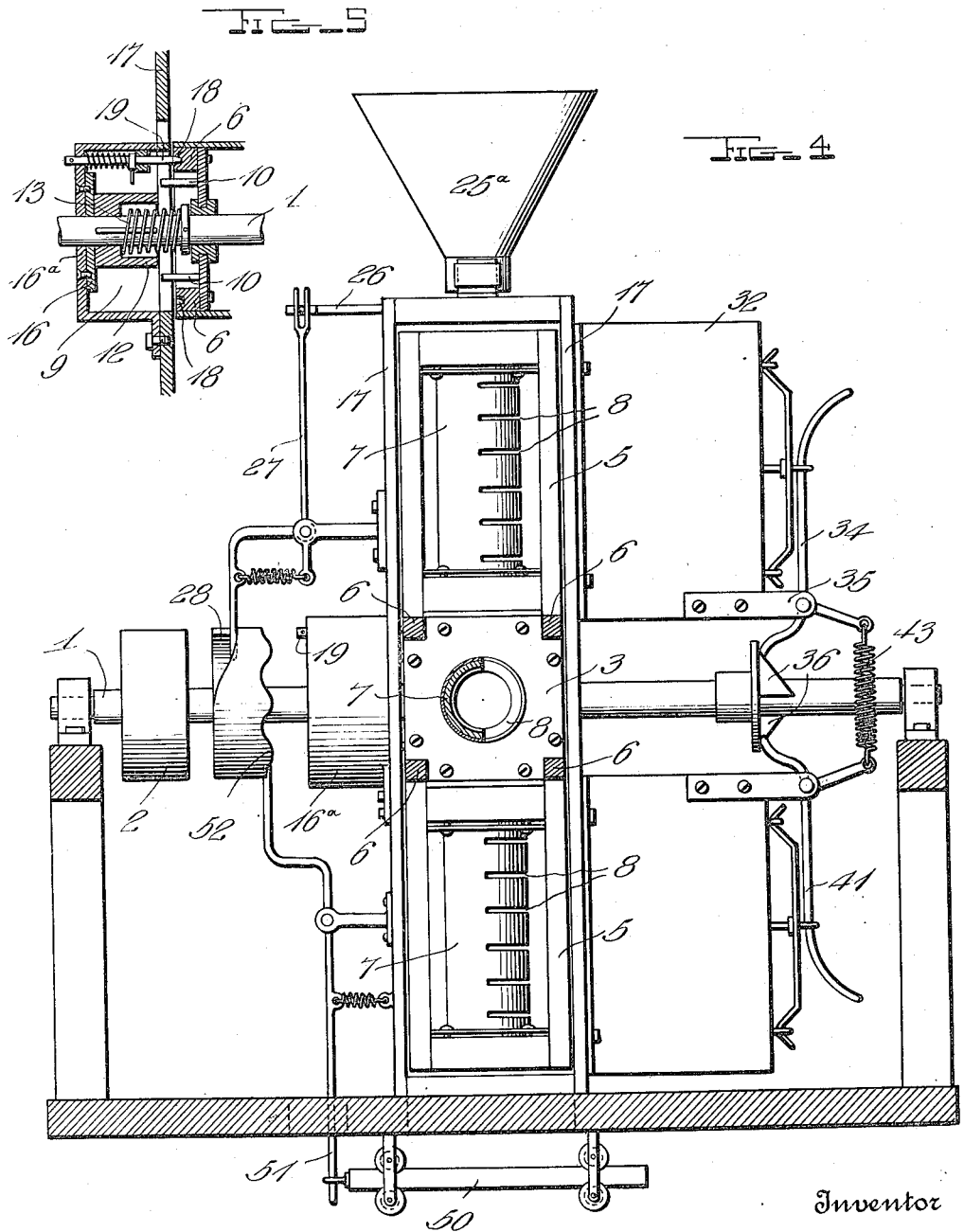

JOHN FRANKLIN FLEMING, OF DEXTER, MAINE, ASSIGNOR OF ONE-HALF TO JOSEPH GANEAU, OF DEXTER, MAINE.

CHOPPER FOR VEGETABLES AND THE LIKE.

1,185,896.  Specification of Letters Patent.  Patented June 6, 1916.

Application filed November 1, 1915. Serial No. 59,113.

*To all whom it may concern:*

Be it known that I, JOHN FRANKLIN FLEMING, a citizen of the United States, residing at Dexter, in the county of Penobscot and State of Maine, have invented certain new and useful Improvements in Choppers for Vegetables and the like; and I do declare the following to be a full, clear, and exact description of the invention, such as will enable others skilled in the art to which it appertains to make and use the same.

My invention is an improved machine for chopping vegetables, fruits, and the like, previous to canning the same, the present embodiment of the invention, however, being designed primarily for cutting bean pods into short lengths.

The object of the invention is to provide a comparatively simple and inexpensive machine for accomplishing the desired end in an efficient manner without excessive use of manual labor.

To this end, the invention resides in certain novel features of construction and in unique combinations of parts of which the accompanying drawings are illustrative.

In these drawings: Figure 1 is a central vertical longitudinal section of the improved machine with the numerous cutting blades retracted, and showing the rotary member locked against movement; Fig. 2 is a similar view with the cutting blades projected and the locking means partially released; Fig. 3 is a central vertical transverse section; Fig. 4 is a vertical longitudinal section taken on the plane of the line 4—4 of Fig. 3; Fig. 5 is an enlarged detail longitudinal section of the clutch and locking mechanisms; Figs. 6 and 7 are detail transverse sections of such mechanisms taken on the planes of the lines 6—6 and 7—7 of Fig. 1; and Figs. 8 and 9 are similar views as seen on the planes of the lines 8—8 and 9—9 of Fig. 2.

In describing the invention, reference will be made to the drawings above briefly described, by similar reference characters placed on corresponding parts throughout the several views.

The numeral 1 indicates a constantly rotated shaft here shown as disposed horizontally and as driven by a pulley 2, although any other preferred means might well be used for rotating such shaft. Mounted loosely on the shaft 1 but held against axial shifting thereon, is an appropriate hub member 3 of any preferred formation, it being shown as of rectangular shape equipped on its four sides with stop plates 4 designed for a purpose yet to appear.

Radiating one from each flat side of the hub member 3 is a plurality of skeleton frames 5 each of which will usually be constructed of four spaced radiating bars 6 whose outer ends are connected by any suitable means. Each frame 6 carries a radially disposed vegetable receptacle 7 shown in the present embodiment of the invention of cylindrical contour, each of said receptacles having formed in one of its sides a plurality of parallel slots 8 disposed transversely thereof. The slots 8 are adapted to receive therein cutting blades yet to be described as the several receptacles 7 are successively presented at a predetermined point on their path of travel, this movement being imparted to said receptacles by the provision of a clutch mechanism 9 which intermittently locks the hub member 3 to the shaft 1 to rotate the former throughout a quarter of a revolution.

The mechanism 9 includes four stop pins 10 extending from one end of the hub member 3 parallel to the axis thereof and spaced equi-distantly, said pins being adapted to be struck by a pair of radiating arms 11 projecting in opposite directions from a sleeve or the like 12 which is slidably mounted on the shaft 1, being shifted normally away from the hub member 3 by a coil spring 13 as shown. The end of the sleeve 12 remote from the arms 11, is formed with a pair of oppositely extending radially disposed noses or the like 14 which are successively brought into contact with a pair of cams 15, each of which is ninety degrees in length, said cams being carried by a rigid plate 16 within a casing 16ᵃ secured to an appropriate housing 17 in which the receptacles 7 operate, although it is obvious that any type of fixed support might well be substituted for the aforesaid plate.

It is to be understood that the sleeve 12 rotates with the shaft 1 and that as the noses 14 engage the cams 15 said sleeve will be shifted toward the hub member 3, thus disposing its arms 11 in position to strike the pins 10, the result being that the hub member and the parts carried thereby will be rotated one quarter of a revolution, whereupon the noses 14 will disengage the cams and the spring 13 will dispose the sleeve to inoperative position.

It is my intention to now lock the hub member 3 against rotation until the clutch mechanism is again thrown in. To this end, one end of the hub member in question is provided with four keepers 18 spaced ninety degrees apart, such keepers being shown in the form of sockets, although they may obviously be of other design. The keepers 18 are adapted to successively receive them in a horizontally slidable spring pressed locking bolt 19 whereby the end above suggested is attained. However, before the clutch mechanism 9 can again rotate the hub member, it is necessary to withdraw the bolt 19, this being accomplished by providing said bolt with a laterally extending projection 20 positioned in the path of cams 21 which extend outwardly from the sleeve 12 at an appropriate point, such cams being so shaped as to strike the projection 20 and retract the bolt 19 from the active keeper 18, previously to the projection of the sleeve 9 toward the hub member to engage the arms 11 and pins 10.

By the construction and arrangement of parts above described, the open outer ends of the vegetable receptacles 7 will be successively presented and will momentarily stop at an inlet mouth 25 in the top of the housing 17, such mouth being controlled by an appropriate valve 26 intermittently opened by a spring actuated rocker arm 27 which is released at proper intervals by an appropriate cam 28 on the shaft 1. If desired, a mechanical feeder, (not shown) may be used for intermittently depositing bunches of beans into the receptacles 7 through the valve 26, as such receptacles are successively presented to the mouth 25, or, the numerous receptacles may be filled by hand as will be obvious.

After filling each receptacle, immediately before the clutch mechanism 9 is thrown in to advance such receptacle along its path, a knife 29 is projected across the inner end thereof between such end and the adjacent stop plate 4, with the result that the stems of the pods will be severed from the bodies thereof, such stems being now forced from the plate 4 upon which they have fallen, by a slip or the like 30 which extends from the blade 29 toward such plate (see Fig. 2).

The blade 29 is carried by the lower end of an upright cross head 31 mounted between a pair of guide plates 32 carried by the housing, said cross head being preferably equipped on its upper end with a dummy knife 33 operating across the open outer end of the receptacles 7. For operating the cross head 31 to project it toward the receptacle 7 which has previously been filled to operate the knife 29 as above specified, and to then retract said head to allow the receptacle in question to travel on its path, I provide an appropriate rocker arm 34 fulcrumed to a fixed support 35 and operated at proper intervals by cams 36 carried by the shaft 1.

As the receptacles 7 filled with beans to be chopped move downwardly from horizontal to upright positions, the contents thereof are prevented from spilling by the provision of an arcuate shield plate 37 carried within the housing 17 and terminating at such a point as to prevent exposing the lower ends of the receptacles until they pass their lowermost upright positions.

As the numerous receptacles reach their lowermost positions, movement thereof is intermittently checked by the mechanism above described, to allow the uppermost of such receptacles to be filled. Simultaneously with this filling operation, however, the contents of the lowermost receptacle are chopped into short lengths by the provision of a plurality of chopping knives 38 insertible into the receptacles through the slots 8 therein, such chopping knives being supplemented by a longer knife 39 which operates over the outer end of the successively presented receptacles to sever the tips of the bean pods from the bodies thereof. All of the knives 38 and 39 are carried by an upright cross head 40 projected at suitably spaced intervals by the rocker arm 41 intermittently actuated by the cams 36 above described. The cams 36 may be either so constructed as to both project and retract the cross heads 31 and 40 or spring means 43 may be used to retract such heads while the cams merely project the same, this arrangement being usually preferable.

The numerous blades 29, 33, 38 and 39 may be guided by any preferred means when retracted to inoperative position, but they preferably travel in channels 44 in the guide plates between which the cross heads 31 and 40 operate, this construction having been found to be very efficient yet easy to manufacture.

Preferably used in conjunction with the features of construction above described, and positioned at the outlet of the machine, regardless of the location of the latter, is a screen 50 reciprocated vigorously in a horizontal direction by a rocker arm 51 driven from a corrugated cam 52 carried by the shaft 1.

Although the operation of the machine would probably be understood from the preceding, it may be well to more specifically explain the same. To this end, I will state that when the receiving receptacle 7 is brought into position at the inlet mouth 25 a bunch of bean pods has been previously dropped into a funnel 25ª positioned at said mouth. These pods are now standing upon their ends upon the sliding valve 26, whereby the moment such valve is suddenly opened by the spring actuated rocker arm 27, the beans will fall as a unit into the uppermost receptacle. Owing to the shape of the funnel 25ª, no pods over two and one-half inches in length can pass through the valve other than endwise, this being very important in order that the machine may operate properly.

Although the pods vary in length from two and one-half to eight inches, the ends are all evened by falling upon them on the active stop plate 4, whereby only the extreme lower ends of such pods will be snipped off by the knife 29.

The moment the uppermost receptacle 7 is filled with a bunch of beans, the cams 36 operate the arm 34 and 41 to project the upper and lower cross heads 31 and 40, the result being that the lower ends of the new bunch of beans is snipped off, while the reverse ends of the beans in the lowermost receptacle are severed in the same manner and forced through an appropriate slot in the housing 17, by a lip on the knife 39 similar to the lip 30 on the knife 29. It is obvious that as the lower ends of the beans in the lower receptacle are snipped off, such beans are chopped in short lengths by the knives 38. During the operation above described, the locking bolt 19 has of course been projected while the clutch has been thrown out of action. However, the moment the chopping and snipping is completed, the cams 36 release the arms 34 and 41 and allow the spring means 43 to act upon such arms to quickly retract the cross heads. At approximately the same moment, one of the cams 21 strikes the pin 20 and starts to release the bolt 19, while the cams 15 also begin to project the sleeve 12 to dispose the radiating arms 11 for contact with the pins 10. By the time these arms 11 contact with the pins, the bolt 19 is fully retracted and is held retracted by the active cam 21 until the uppermost arm 11 passes the path of movement of said bolt, while said arms 11 are turning the hub member 3 and parts carried thereby through a quarter of a revolution. Immediately after this, however, the bolt is released, whereby it may spring into the approaching socket 18 the moment such socket is properly positioned. Simultaneously with the projection of the bolt into the socket, the noses on the sleeve 12 jump from the cams 15 and thus the clutch is thrown out, thus again arresting movement of the machine while again filling the same.

It is to be observed that the pods in each receptacle have one end snipped off immediately after being deposited in such receptacle, and that as the machine rotates, these pods are inverted, whereupon the knife 39 comes into action to sever the other ends from the bodies of the pods. By the construction shown, none of the severed ends may be discharged with the chopped beans.

After each chopping operation, when all the knives are retracted, the chopped contents of said machine will be discharged upon the plate 37, and as the machine continues to rotate, such choppings will be forced from the plate 37 onto the screen 56 which sifts therefrom any ends or pieces too short to be used for canning purposes.

The capacity of the smallest machine exceeds that of over one hundred and fifty hand workers, this meaning a great saving, since hand labor has heretofore been used exclusively for chopping bean pods. Furthermore, the capacity of the machine can be greatly increased at small additional cost. For instance, two series of receptacles 7 may be run on the same shaft, and the number of receptacles of each series may of course be varied at will. The receptacles in question can be made rectangular if desired and of such size as to hold an average of ten pods. Thus, if a machine be manufactured with two series of receptacles 7, each containing eight of such receptacles, one hundred and sixty pods may be cut to each revolution. At a speed of only sixty revolutions per minute, the machine would thus cut over three bushels a minute, or as many in one hour as the average force of one hundred hands in a canning plant.

The foregoing is thought to be ample to render the construction and operation of the machine well understood to those skilled in the art to which the invention relates.

In the drawings certain specific details have been shown for illustrative purposes, and in the above these details have been described, but obviously numerous changes may be made within the scope of the invention as claimed.

I claim:—

1. In a chopper for vegetables and the like, the combination of a series of vegetable receptacles movable simultaneously along a given path and each having a plurality of transverse slots in its wall, means for intermittently advancing the series of receptacles, chopping means at a fixed point spaced from the aforesaid path and including a plurality of knives opposite which the slots in the receptacles are successively presented, and means for projecting said knives into the receptacles through the slots thereof while the receptacles stand inert.

2. In a chopper for vegetables and the like, the combination of a series of vegetable receptacles movable simultaneously along a given path, means for intermittently advancing the series of receptacles, a single chopping knife disposed at a fixed point adjacent the aforesaid path and movable across one end of the successively presented receptacles, a plurality of chopping knives disposed at an additional fixed point on the aforesaid path and insertible into the bodies of the successively presented receptacles, and means for operating all of said knives.

3. In a chopper for vegetables and the like, the combination of a rotary member and means for intermittently rotating the same, a plurality of radially disposed vegetable receptacles carried by said member and adapted to be successively disposed at a pair of points on their path of travel, a single cutting knife disposed at one of said points and movable across one end of the successively presented receptacles, a plurality of chopping knives disposed at the other point and insertible into the body of the successively presented receptacles, and means for projecting all of said knives.

4. In a chopper for vegetables and the like, the combination of a rotary member having a horizontal axis and means for intermittently rotating said member, a plurality of radially disposed vegetable receiving cylinders carried by said member and having open outer ends, one side of said cylinders being formed with a plurality of parallel slots disposed transversely thereof, a series of cutting blades located at a fixed point spaced from the path of travel of the cylinders, and means for projecting said blades into the successively presented cylinders through the slots therein while the rotary member stands inert.

5. In a chopping device for vegetables and the like, the combination of a single constantly rotated shaft, a hub member mounted loosely on said shaft, a plurality of vegetable receptacles carried by said hub member, an intermittently actuated clutch mechanism for intermittently locking the hub member to the shaft whereby to successively dispose the receptacles at a predetermined point on the path of travel, cutting means at such point for chopping the contents of the receptacles, and means driven by the shaft for operating such cutting means.

6. In a chopper for vegetables and the like, the combination of a constantly rotated shaft, a hub member mounted loosely thereon, a plurality of vegetable receptacles carried by said hub member, an intermittently actuated clutch mechanism for intermittently locking the hub member to the shaft whereby to successively dispose the receptacles at a predetermined point on their path of travel, an intermittently actuated locking device for preventing rotation of the hub member when the clutch mechanism is released, and cutting means disposed at the aforesaid point for chopping the contents of the successively presented receptacles.

7. In a chopper for vegetables and the like, the combination of a constantly rotated shaft, a hub member mounted loosely thereon, a plurality of vegetable receptacles carried by said hub member, an intermittently actuated clutch mechanism for intermittently locking the hub member to the shaft whereby to successively dispose the receptacles at a predetermined point on their path of travel, an intermittently actuated locking device for preventing rotation of the hub member when the clutch mechanism is released, cutting means disposed at the aforesaid point, and means operated by the shaft for actuating said cutting means as the receptacles are successively presented.

8. In a chopper for vegetables and the like, a rotary member, a plurality of radially disposed vegetable receptacles carried thereby and having both inner and outer open ends, stop surfaces spaced from the inner ends of said receptacles, means for intermittently rotating the aforesaid member to successively dispose the receptacles at a predetermined point on their path of travel, a cutting knife disposed at said point and movable across the open inner ends of the successively presented receptacles, and a lip extending from said knife toward the stop surfaces adjacent the inner ends of the receptacles for the purpose specified.

9. In a bean cutting machine of the class described, the combination of means for snipping one end of the beans, additional means for then snipping the other end thereof, and means for cutting the beans into short lengths simultaneously with the second snipping operation.

10. In a bean cutting machine of the class described, a plurality of simultaneously movable elongated receptacles adapted to receive the beans, means for moving said receptacles along a given path, a knife at a fixed point adjacent said path for snipping one end of the beans in said receptacles as the latter are presented, an additional knife at another point adjacent said path for snipping the other end of said beans, and a series of chopping knives for cutting the beans into short lengths simultaneously with the second snipping operation.

11. In a bean cutting machine of the class described, an upstanding vertically elongated receptacle adapted to receive the beans, a support at the lower end of said receptacle on which said beans are adapted to rest when fed into said receptacle, means for snipping the lower ends of said beans while resting on said support, means for then inverting the receptacle, a second support on which the other ends of the beans rest after being inverted, additional means for snipping said other ends while resting on said second support, and means for chopping the beans into short lengths simultaneously with the second named snipping operation.

12. In a bean cutting machine of the class described, an upstanding vertically elongated receptacle adapted to receive the beans, a support at the lower end of said receptacle on which said beans are adapted to rest when fed into said receptacle, means for snipping the lower ends of said beans while resting on said support, means for then inverting the receptacle, a second support on which the other ends of the beans rest after being inverted, a knife for snipping said other ends, while resting on said second support, a cross head to which said knife is secured, means for reciprocating said cross head, and a plurality of chopping knives also secured to said cross head and adapted to sever the beans into short lengths simultaneously with the second named snipping operation.

13. In a bean cutting machine of the class described, an upstanding vertically elongated receptacle adapted to receive the beans, said receptacle having a plurality of superimposed horizontal slots formed in its wall, means for snipping the lower ends of the beans deposited into said receptacle, means for then inverting said receptacle, a support upon which the other ends of the beans rest after being inverted, a horizontally movable knife for snipping said other ends of the beans while resting on said support, an upright cross head to which said knife is secured, means for reciprocating said cross head, and a plurality of superimposed horizontal chopping knives also secured to said cross head and adapted to be inserted into the receptacle through the aforesaid slots to chop the beans into short lengths simultaneously with the second named snipping operation.

In testimony whereof I have hereunto set my hand in presence of two subscribing witnesses.

JOHN FRANKLIN FLEMING.

Witnesses:
L. B. WALDRON,
S. M. LEIGHTON.